Oct. 8, 1935.  R. C. SPRAGUE  2,016,303
ELECTROLYTIC CONDENSER AND CIRCUIT ARRANGEMENT THEREFOR
Original Filed Nov. 12, 1932
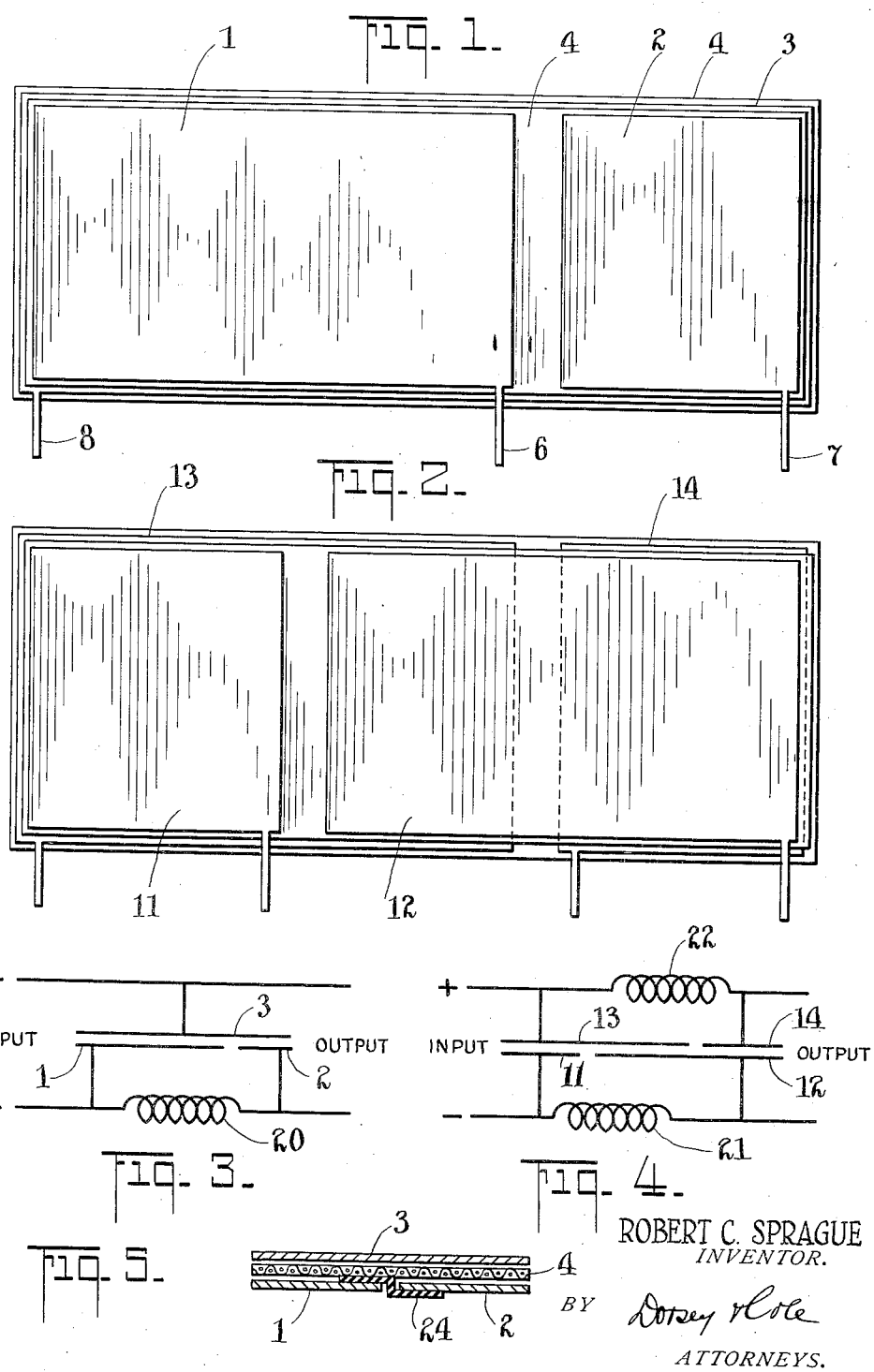
ROBERT C. SPRAGUE
*INVENTOR.*
BY Dorsey Cole
*ATTORNEYS.*

Patented Oct. 8, 1935

2,016,303

UNITED STATES PATENT OFFICE 2,016,303

ELECTROLYTIC CONDENSER AND CIRCUIT ARRANGEMENT THEREFOR

Robert C. Sprague, North Adams, Mass., assignor to Sprague Specialties Company, North Adams, Mass., a corporation of Massachusetts Original application November 12, 1932, Serial No. 642,432. Divided and this application April 25, 1933, Serial No. 667,871

6 Claims. (Cl. 178—44)

My invention relates to electrolytic condensers having a low fluidity electrolyte and to the utilization of such condensers in filter circuits.

This application is a division of my co-pending application, Ser. No. 642,432, filed November 12, 1932.

The most commonly used electrolytic condensers with low fluidity electrolyte, comprise two metal members—which are as a rule metal foils and are referred to as the two electrodes—one or both of which are of a film-forming metal as aluminum, and of a low fluidity electrolyte interposed between the two electrodes and generally carried by a fibrous spacer. Such electrolyte as a rule comprises a weak acid and a salt of a weak acid, a viscous ionizing agent as glycerine and in addition a small amount of water and one type of such condensers and their method of manufacture is described in the co-pending application of Preston Robinson, Ser. No. 548,270, filed July 1, 1931.

I shall describe my invention on hand of such condensers, although it should be well understood that my invention is not limited to the above type of condensers but can be applied also to other types of condensers having a low fluidity electrolyte.

Such electrolytic condensers obtain their capacity effect through the formation of thin layers or films of unilateral conductivity at the boundary of one or both electrodes.

When such condensers are used in filter circuits of radio receiving sets or of other devices it is as a rule sufficient to have such a layer or film formed at one of the two metal members. For instance, when film-forming metals, as aluminum, tantalum, zirconium, etc. are used for both electrodes, only one of the two metal members need to have an electrolytically formed film, or only one of the two electrodes needs to be of film-forming metal.

While the two metal members are generally referred to as the two electrodes, in the case of condensers of the type now under discussion, only the filmed member forming the anode is an electrode in the true sense, whereas the cathode is constituted by the electrolyte, and the unfilmed metal member merely serves as an outside connection for the cathode-electrode. However, in accordance with common usage I shall refer to both metal members as electrodes and to the unfilmed electrode as the cathode.

While in general the two electrodes are long strips and together with the interposed electrolyte are wound into a roll, the condenser, as is well known, may be also built up into a stack.

In filter circuits, especially for radio receiving circuits, as a rule more than one condenser is required and for instance a filter arrangement in which a choke-coil is inserted in the load circuit and two condensers placed across the load circuit on the two sides of the choke-coil is widely used.

It has already been suggested to provide instead of two separate condensers, a so-called multiple-section condenser unit in which two or more condensers are so combined that each of the condensers has one individual electrode and all of them have a common electrode. No difficulty is encountered in using such a construction in the case of impregnated paper condensers, a suitable construction being shown in my Patent No. 1,795,411.

However, in the case of electrolytic condensers difficulties arise when making and using multiple unit condensers due to the electrolytic interaction between the electrodes.

While multiple electrolytic condensers have already been suggested, such condensers were of the wet type having a highly liquid electrolyte and it was found that only such constructions were operative in which a common cathode and a plurality of anodes were used and that it was altogether unfeasible to use a common anode and a plurality of cathodes.

Even when a common cathode and a plurality of anodes are used in such condensers, it is necessary to provide special means, in the form of shields or separators, to avoid a common low-resistance electrolytic path of the individual anodes, and even when such means are provided the interaction between the anodes is only reduced but not altogether eliminated.

Because of the above and because of the fact that the generally used filter circuits do not permit the use of a common cathode,—although such circuits would permit the use of a common anode,—multiple electrolytic condensers prior to the present invention have found only a very limited application.

By providing an electrolytic condenser having a comparatively high specific electrolyte resistance and having a construction more fully discussed hereafter, I have succeeded in obtaining multiple electrolytic condensers adapted to be used in the various type of filter circuits employed.

In the drawing which forms part of this specification:

Figure 1 is a plan view illustrating schematically the development of a two-section condenser embodying one form of my invention.

Fig. 2 is a plan view illustrating schematically the development of a three-section condenser embodying another form of my invention.

Fig. 3 is a diagram showing a filter circuit using a condenser as shown in Fig. 1.

Fig. 4 is a diagram of a filter circuit using a condenser, as shown in Fig. 2.

Fig. 5 is a sectional side view of a condenser embodying my invention with a separator inserted between two cathode foils.

Referring to Fig. 1, 1 represents an individual electrode, 2 represents another individual electrode, 3 represents a common electrode, and 4—4 are spacers carrying the electrolyte. 6, 7 and 8 are projecting extensions preferably integral with the electrodes 1, 2 and 3 respectively, and serve for their outside connection. The electrode 1 and part of the electrode 3—with the interposed electrolyte, form one of the condenser sections and the electrode 2 and the opposing portion of the electrode 3, with the interposed electrolyte, form the other condenser section.

In each condenser at least the electrodes forming the anodes have to be of a film-forming metal, as aluminum, tantalum, zirconium, etc., whereas the other electrodes forming the cathodes may be of filming or non-filming metal. In case the cathodes are of a non-filming metal, tinfoil or copper foil, or nickel-plated copper foil may be used.

For reasons later to be explained I prefer to make all of the electrodes of film-forming metal, for instance of aluminum, but only the anodes are formed with a film adapted to stand the operating voltage. In case the electrode 3 is provided with such film the unit will have a common anode, whereas if the electrodes 1 and 2 are provided with such film, the unit will have a common cathode. The film on the anode is preferably formed according to the process described in the aforesaid application of Preston Robinson.

As electrolyte, I prefer to use a weak acid, as boric or phosphoric acid, to which preferably is added a weak salt, for instance, ammonium borate, borax or a phosphate salt, whereby the salt does not need to be the salt of the acid used. As an ionizing solvent I prefer to use a viscous polyhydric alcohol, for instance, glycerine or ethyglycol, to which a small amount of water is added, which also acts as ionizing solvent. The electrolyte may also comprise an inert substance to increase its viscosity.

As stated, the electrolyte is preferably carried by a spacer which may be a gauze or other suitable fibrous or porous material.

While in the drawing the electrode 3 extends beyond the electrodes 2 and 1 on all four sides, this is merely shown for the sake of clearness and such overlapping in practice is not required although in some cases I prefer to have the electrode 3 extend on one side beyond the electrodes 1 and 2, and the electrodes 1 and 2 extend on the other side beyond the electrode 3.

The condenser is assembled into a roll and if desired pressed into rectangular shape and preferably subjected to further processing as described in the co-pending application of Preston Robinson, Serial No. 627,305, filed August 2, 1932 now Patent No. 1,935,860, issued November 21, 1932. A condenser of this type can be used in a filter circuit, schematically shown in Fig. 3, which comprises an inductance 20 inserted between the input and the output in the negative side of the filter. The condenser of Figure 1 is thereby so connected that the common anode 3 is connected to the positive conductor between the input and output, whereas the electrodes 1 and 2 are connected on the input side and output side respectively of the inductance 20.

As stated previously, I prefer to use also for the cathodes 1 and 2 a film-forming metal, for instance, aluminum, and this for the following reason: Although the insulating resistance between the two cathodes 1 and 2 is quite high and due to the immobility of the electrolyte and its high resistance, which is of the order of 10,000 ohms and even higher, the interaction between the two cathodes is minimized, nevertheless even the small current flowing between the two cathodes does interfere with the independent operation of the two condenser sections and would thus deleteriously influence the characteristics and operation of the unit.

When making the cathodes of film-forming metal the leakage current thus flowing between the cathodes acts as a forming current which gradually forms a film on one of the cathodes, namely, on that cathode which is the less negative of the two and which thus acts as an anode in regard to the other. For instance, in the case illustrated such film forms on the cathode 2. As the film gradually forms on this cathode, the resistance between the two cathodes correspondingly increases and as the film has a very high ohmic resistance the current will gradually decrease to practically zero whereby thus all interaction between the two cathodes is eliminated. While this film formation on the less negative cathode takes place fairly rapidly and can be provided for before the condenser is placed in operation, I prefer especially if the voltage difference between the cathodes is relatively high, for instance, of the order of 50 volts, to preform—before or after assembly—the less negative cathode to a voltage corresponding to the voltage difference which will exist in operation between the two cathodes.

The embodiment shown in Fig. 2 is similar to that of Fig. 1 except that both electrodes are subdivided to give a condenser adapted to replace three individual condensers. An electrode 11 and an electrode 12 are provided on one side of the electrolyte and an electrode 13 and an electrode 14 are provided on the other side of the electrolyte. The electrode 13 opposes the electrode 11 and part of the electrode 12, whereas the electrode 14 opposes part of the electrode 12. The three condenser sections are formed as follows: section *a* electrodes 13 and 11; section *b* electrode 13 and part of electrode 12; section *c* electrode 13 and the other part of electrode 12.

In Fig. 4 is shown a circuit in which use is made of a condenser according to Fig. 2. In this case an inductance 21 is placed in the negative line between the input and the output and an inductance 22 placed in the positive line between the input and output. The anodes 13 and 14 are connected to the input and output side respectively of the inductance 22 and the cathodes 11 and 12 are connected to the input and output side respectively of the inductance 22.

It should be well understood that again it is preferable to make the cathode also of film-forming metal for the reasons set forth in connection with the first discussed embodiment.

It is also possible to increase the resistance between the individual cathodes by providing an insulator between same, for instance, in the form of a varnished paper 24 (see Fig. 5) which isolates the two cathodes and extends on both sides, also in the axial direction of the condenser beyond the cathodes. The resistance between the cathodes may be increased to 50,000 ohms and more by using such insulators.

Condensers according to my invention can also be used in arrangements where a common cathode is used with a plurality of anodes. Also instead of providing two cathodes or two anodes a larger number of cathodes or anodes may be used. Other modifications of my invention may suggest themselves without departing from the spirit of my invention. I therefore desire the appended claims to be construed as broadly as permissible in view of the prior art.

In the claims the term "dry" electrolytic condenser refers to a condenser the electrolyte of which is of low fluidity, as contrasted with a "wet" electrolytic condenser the electrolyte of which is of high fluidity.

What I claim as new and desire to secure by Letters Patent is:

1. An electric filter circuit comprising an inductance and a multiple section dry electrolytic condenser unit, said unit comprising a common anode and two cathodes, said anode and cathodes being of film-forming metal, an output side and an input side for said circuit, said inductance being connected in the negative lead between the input and the output and said anode being connected to the positive lead between the input and the output, the two cathodes being connected to the two ends of the inductance respectively and means to minimize the capacity coupling between the sections of the condenser unit.

2. A filter circuit comprising an input and an output, an inductance connected in the positive line between the input and the output, a second inductance connected in the negative line between the input and the output, and a dry electrolytic condenser having two anodes and two cathodes, said anode and cathodes being of film-forming metal, an anode being connected to each side of the first inductance and a cathode being connected to each side of the second inductance and means to minimize the capacity coupling between the sections of the condenser unit.

3. An electric filter circuit comprising an inductance and a multiple section dry electrolytic condenser unit, said unit comprising at least one anode and two cathodes, said anode and cathodes being of film-forming metal, an output side and an input side for said circuit, said inductance being connected in the negative lead between the input and the output and said anode being connected to the positive lead between the input and the output, the two cathodes being connected to the two ends of the inductance respectively and means to minimize the capacity coupling between the sections of the condenser unit.

4. An electric filter circuit comprising an input and an output, an inductance connected in the positive line between the input and the output, a second inductance connected in the negative line between the input and the output, and a multiple section dry electrolytic condenser unit having one section connected across the input, a second section connected across the output and a third section connected between the positive side of the input and the negative side of the output.

5. An electric filter circuit comprising an input and an output, an inductance connected in the positive line between the input and the output, a second inductance connected in the negative line between the input and the output, and a three-section dry electrolytic condenser unit having two cathodes and two anodes, one anode forming with one cathode one of the sections, said anode forming with one portion of the second anode cathode the second section and the second anode forming with the other portion of the second cathode the third section, said anodes being connected to the two ends of the first inductance and the cathodes being connected to the two ends of the second inductance.

6. A filter circuit comprising an input side and output side, an inductance connected in the positive line between the input and the output, a second inductance connected in the negative line between the input and the output, and three condensers, one condenser being connected across the input, the second condenser being connected across the output, and the third condenser being connected between one side of the input and to that side of the output, which has an opposite polarity.

ROBERT C. SPRAGUE.